May 4, 1954  J. OMMODT  2,677,225
SELF-PROPELLED SWATHER
Filed Sept. 4, 1951  4 Sheets-Sheet 2

Inventor
Julius Ommodt
By
Merchant & Merchant
Attorneys

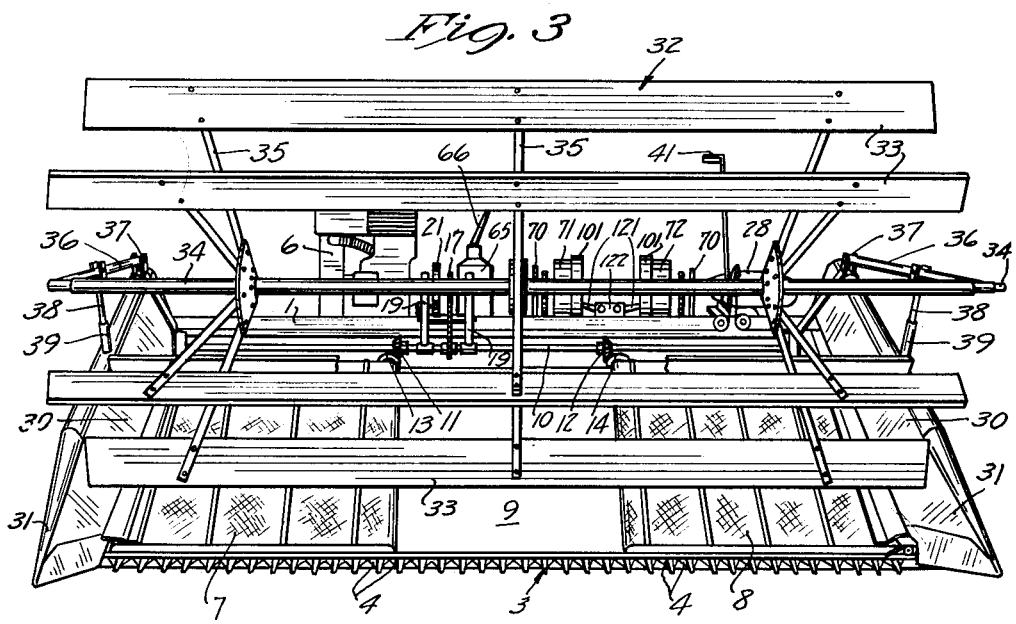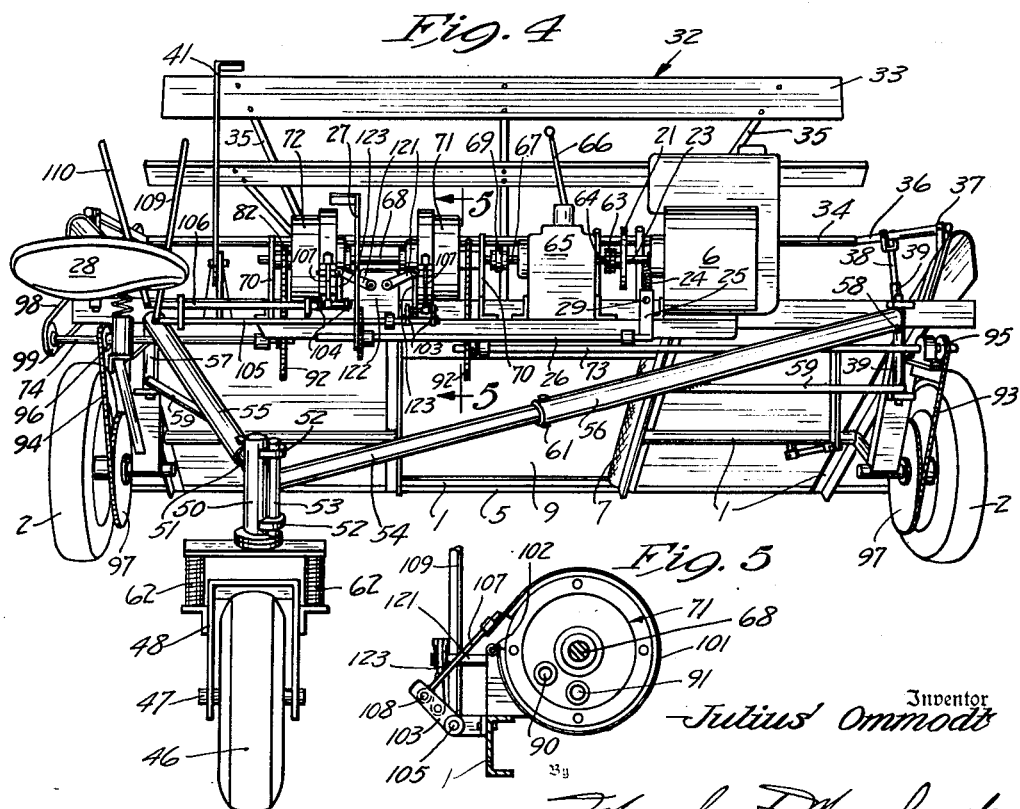

May 4, 1954 J. OMMODT 2,677,225
SELF-PROPELLED SWATHER
Filed Sept. 4, 1951 4 Sheets-Sheet 4

INVENTOR
Julius Ommodt
BY
Merchant & Merchant
ATTORNEYS

Patented May 4, 1954

2,677,225

UNITED STATES PATENT OFFICE 2,677,225

SELF-PROPELLED SWATHER

Julius Ommodt, New Ulm, Minn., assignor to Owatonna Manufacturing Co. Inc., Owatonna, Minn., a corporation of Minnesota Application September 4, 1951, Serial No. 245,008

4 Claims. (Cl. 56—23)

My invention relates generally to swathers or windrowers and more particularly to novel self-propelled swather construction.

An important object of my invention is the provision of a swather which will cut grain closely adjacent a fence or wall and will leave a windrow of cut material in spaced relation thereto and to the standing grain.

Another important object of my invention is the provision of a novel wheel arrangement for supporting a swather whereby neither the windrowed nor the standing grain will be run over by the supporting wheels as the machine traverses a field.

Another object of my invention is the provision of a swather which will deliver the cut grain in crisscross arrangement in a swath and with the heads of the stalks of grain uppermost in the swath, whereby the grain will dry evenly without subsequent turning. To this end, I provide a pair of laterally spaced belt conveyors each inclining rearwardly from the sickle bar of the swather and delivering cut grain to the central discharge opening defined by the discharge ends of the conveyors.

A still further object of my invention is the provision of novel transmission mechanism for propelling swathers of the above type.

Another object of my invention is the provision of a swather, as set forth, which is relatively simple and inexpensive to manufacture, which is efficient in operation, and which is relatively light in weight but rugged in construction and durable in use.

Other highly important objects and advantages of my invention will become apparent from the following detailed specification, appended claims, and attached drawings.

Referring to the drawings which illustrate the invention and in which like characters indicate like parts throughout the several views:

Fig. 3 is a view in front elevation;

Fig. 4 is a view in rear elevation;

Fig. 5 is an enlarged fragmentary detail partly in side elevation and partly in section, taken substantially on the line 5—5 of Fig. 4;

Figure 2:
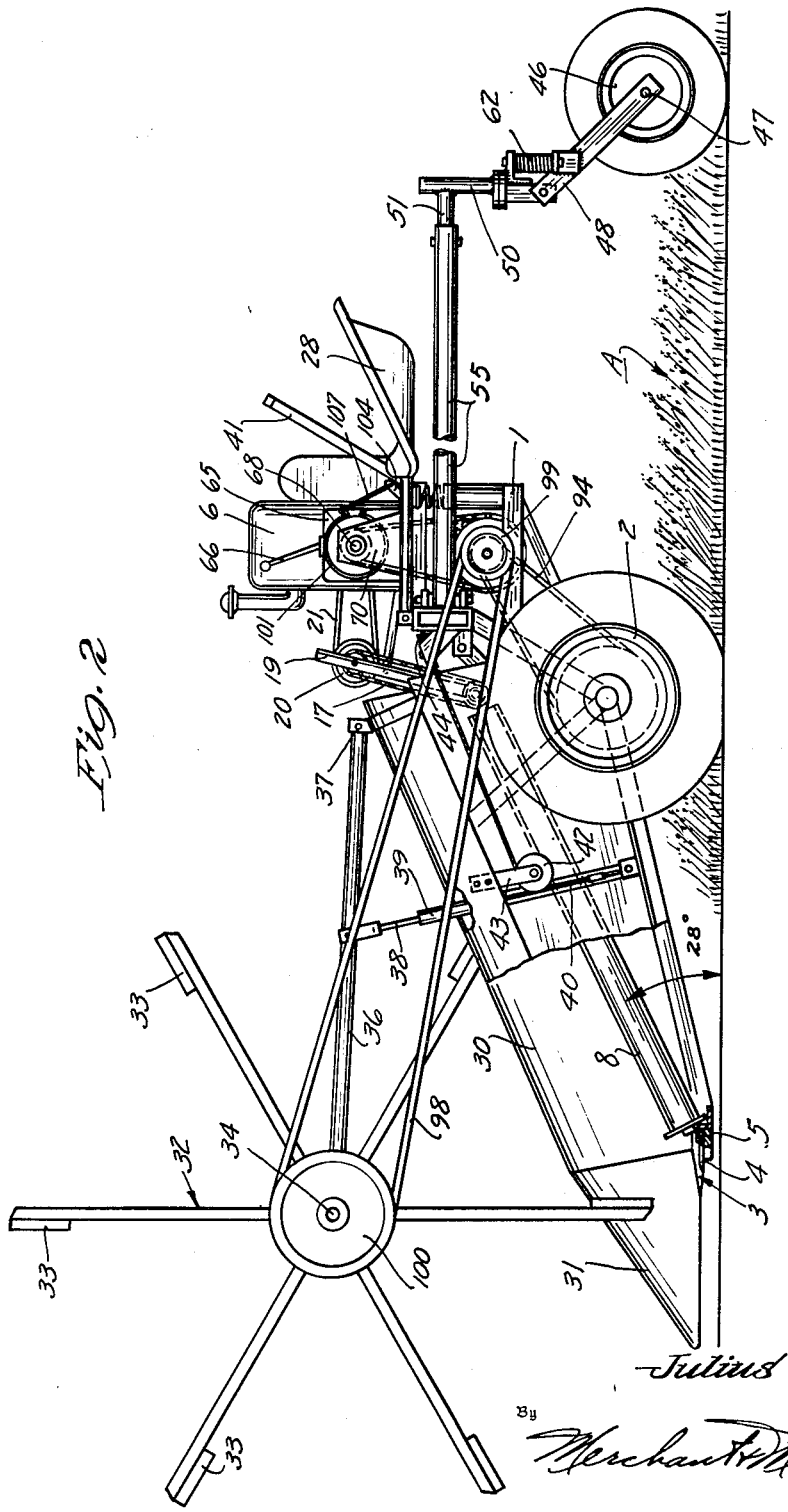
Fig. 2 is a view in side elevation, some parts being broken away and some parts shown in section.

Referring with greater detail to the drawings, the numeral 1 indicates in its entirety a frame structure supported at its opposite ends by a pair of pneumatic tire equipped ground wheels 2. A conventional mower sickle 3 extends across the front end portion of the frame structure and is provided with knives 4 which are carried by a reciprocating mower bar 5 that is caused to reciprocate by an internal combustion engine 6 and operating connections therewith, not shown. These operating connections are conventional in nature, and do not, in themselves, comprise the invention. Hence, for the sake of brevity, it is thought unnecessary to describe the same in greater detail. A pair of endless belt conveyors 7 and 8 are mounted in the frame structure 1 for grain delivering movements laterally inwardly toward the central portion of the frame structure. The inner delivery ends of the conveyors 7 and 8 define the opposite sides of a discharge opening 9 through which the cut grain falls to the ground in a windrow from the conveyors. With reference to Figs. 2 to 4 inclusive, it will be seen that the belt conveyors 7 and 8 incline rearwardly from the sickle bar 3, the inclination thereof being between 25° and 35° from the horizontal plane. In practice, I have found that an inclination of 28° from the horizontal provides the most efficient angle for the proper laying of the grain in the windrow. The conveyors 7 and 8 are driven from the motor 6 by means of mechanism including a transverse shaft 10 on which are rigidly mounted a pair of spaced bevel gears 11 and 12 which have meshing engagement with bevel gears 13 and 14 fast on the ends of conveyor shafts 15 and 16 associated with the delivery ends of their respective belt conveyors 7 and 8. An endless link chain 17 runs over suitable sprockets one on the transverse shaft 10 and another on a jack shaft 18 that is journalled between a pair of arms 19 that are pivotally mounted at their inner ends on the transverse shaft 10. Rigidly secured to the jack shaft 18 is a pulley 20 over which runs an endless belt 21. The belt 21 runs over another pulley 22 fast on a drive shaft 23 coupled to the engine 6.

The mounting arms 19 and the jack shaft 18 are movable about the axis of the transverse shaft 10 by a coil compression spring 24 which is interposed between one of the arms 19 and a crank-acting arm 25 fast on one end of a control shaft 26 journalled in suitable bearings in the frame structure 1. A control lever 27 is rigidly secured to the control shaft 26 adjacent an operator's seat or station 28. Movement of the lever 27 in one direction will cause the crank-acting arm 25 to compress the spring 24 against one of the arms 19 to cause the arms 19 to swing in a direction to tighten the belt 21 sufficiently to impart driving friction therebetween and its cooperating pulleys 20 and 22, whereby to drive the belt conveyors 7 and 8. Obviously, moving the control lever 27 in the opposite direction will ease the compressive force of the spring 24 sufficiently to permit the pulley 22 on the drive shaft 23 to rotate freely without delivering any power to the pulley 20 and the conveyors 7 and 8. A supporting rod 29 is secured at one end to one of the arms 19 and extends loosely through the spring 24 and the crank-acting arm 25, whereby to support the compression spring 24.

Rigidly mounted on opposite ends of the frame structure are a pair of guards 30 which partially overlie the ground wheels 2 and which at their forward ends terminate forwardly of the sickle bar 3 to provide gathering arms or the like 31. A reel 32 comprises a plurality of circumferentially spaced paddles or the like 33 which are supported from a central shaft 34 by radial arms 35. The shaft 34 extends transversely of the machine and is supported at its opposite ends by forwardly projecting legs 36 pivotally mounted at their rear ends each to an opposite guard 30, as indicated at 37. Intermediate their ends, the legs 36 are connected to extensible and retractable supporting members 38 longitudinally slidable in tubular guides 39 and which are extended or retracted by cables 40 extending from the lower ends of the members 38 to an adjustment lever 41 and running over suitable pulleys 42 mounted on bearing brackets 43 secured to the guards 30. The cables 40 run over other pulleys 44 and 45 suitably journalled in the frame structure 1. As indicated in Fig. 2, the reel 32 overlies the sickle bar 3 and is connected for operation to the motor 6 by means hereinafter to be described.

Figure 1:
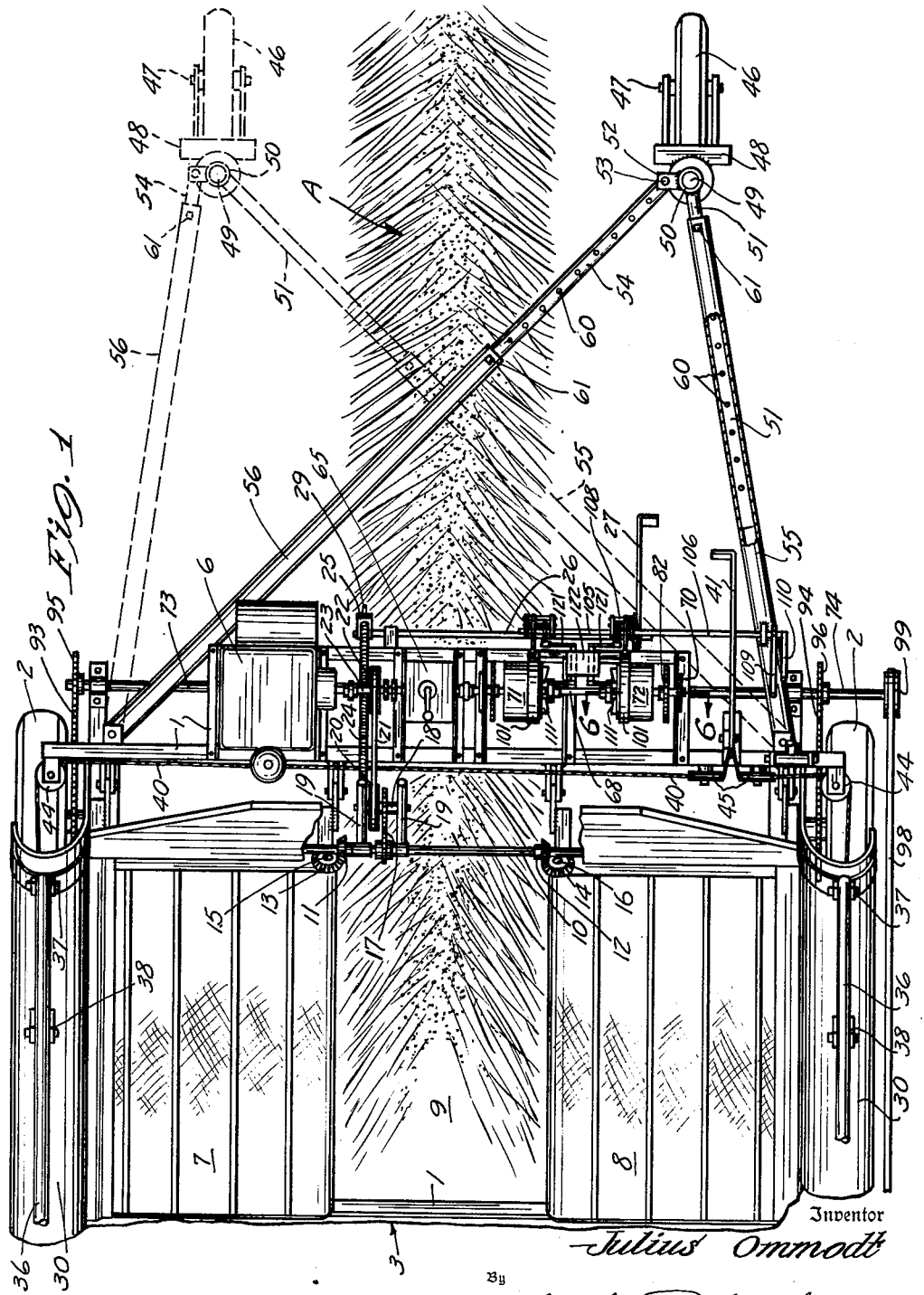
Fig. 1 is a view in plan of a swather built in accordance with my invention, some parts being broken away and some parts shown in section.

The motor 6 and power transmission mechanism for imparting driving or propelling movements to the wheels 2 are located on the frame structure behind the aligned axes of the wheels 2 and are of sufficient weight to overbalance the parts of the machine forward of said aligned axes. To support the machine in its operative position of Fig. 2, I provide a pneumatic tire equipped caster wheel 46 journalled on a shaft 47 which is mounted in a bifurcated bearing bracket or the like 48 and extends in a horizontal direction. The bracket 48 is provided with a vertical spindle 49 which is rotatable within a sleeve 50 to which is rigidly secured by welding or the like the outer end of an extensible and retractable arm 51. With reference to Fig. 4, it will be seen that the sleeve 50 is provided with a pair of axially spaced laterally outwardly projecting ears 52 having aligned apertures through which extends a pintle 53 in spaced parallel relationship to the vertical axis of the sleeve 50. The outer end of a second extendable and retractable arm 54 is welded or otherwise rigidly secured to the pintle 53, whereby to partake of pivotal movements with respect to the arm 51 in a substantially horizontal plane. The inner end portions of the arms 51 and 54 are slidably telescoped into the rear end portions of tubular elements 55 and 56 respectively, the front ends of which are pivotally secured to opposite end portions of the frame structure 1, as indicated at 57 and 58 respectively, about vertical axes. With reference to Fig. 4, it will be seen that brace members 59 extend from the intermediate portions of the tubular members 55 and 56 to the pivot joints 57 and 58 to maintain the tubular members 55 and 56 in a rigid condition. The extensible and retractable arms 51 and 54 are each provided with a plurality of longitudinally spaced transverse apertures 60 which are alignable with transverse apertures in the outer end portions of the tubular members 55 and 56 and through which and the apertures 60 extend nut-equipped bolts or pins 61. With particular reference to Fig. 1, it will be seen that, by extending one of the arms and retracting the other with respect to its cooperating tubular member, it is possible to locate the caster wheel 46 in laterally outwardly spaced relation to one side or the other of a windrow of grain delivered through the discharge opening 9 by the belt conveyors 7 and 8, said windrow being identified by A. As shown and as above indicated, the telescoping members converge rearwardly of the machine toward the caster wheel 46 whether the same is on one side of the windrow A or the other side thereof. The caster wheel mounting bracket 48 is provided with springs 62 which absorb most of the shock imparted to the caster wheel 46 when the machine is moved over more-or-less rough terrain and reduce most of the shock which would otherwise be transferred to the machine, thus preventing excessive vertical movement of the sickle bar 3 during operation.

The drive shaft 23 is connected, by a flexible coupling or the like 63, to the input shaft 64 of a conventional speed changer contained within a housing 65 and provided with a shift lever 66. The output shaft 67 of the speed changer is coupled to a second shaft 68 by means of a flexible coupling or the like 69, said shaft 68 being journalled in a pair of bearing brackets or the like 70. The speed changer 65 is not essential to the effective operation of the machine and may be omitted or included in the power transmission mechanism, as desired.

Figure 6:
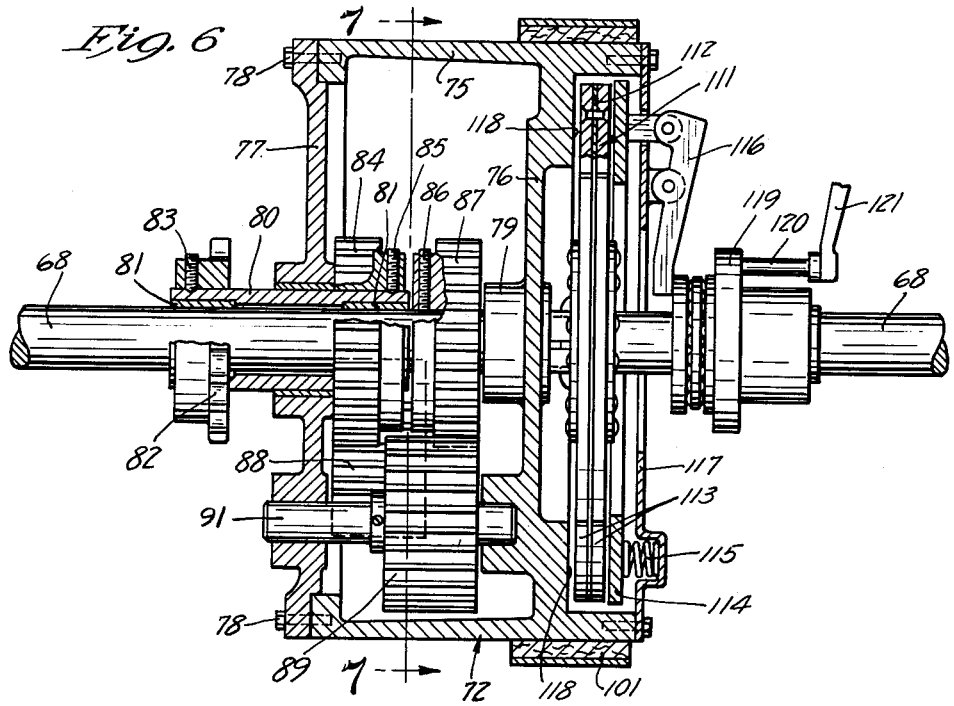
Fig. 6 is an enlarged axial section of one of a pair of like transmission elements of my invention, taken substantially on the line 6—6 of Fig. 1 on an enlarged scale.
Figure 7:
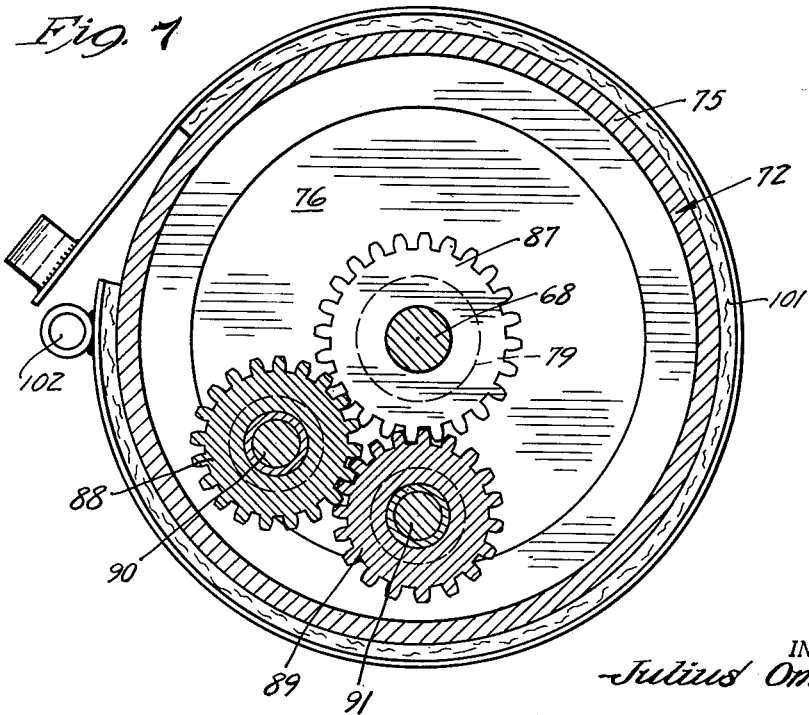
Fig. 7 is a transverse section, taken on the line 7—7 of Fig. 6.

Means for imparting swather propelling rotation to the ground wheels 2 independently of each other from the motor driven shaft 68 includes a pair of rotary members 71 and 72, countershafts 73 and 74 one each associated with a respective rotary element 71 and 72, and connections between said countershafts and their respective rotary elements and between said countershafts and one of said ground wheels 2, now to be described. The rotary elements 71 and 72 comprise parts of identical power transmission mechanisms but one of which, for the sake of brevity, will be described. With particular reference to Figs. 6 and 7, it will be seen that the rotary member 72 is drum-like in form having a cylindrical wall 75 and an integrally formed end wall 76 adjacent one end thereof and a detachable wall element 77 secured to the cylindrical wall 75 by screws or the like 78. The end wall 76 is provided with a central bearing boss 79 which is journalled on the shaft 68 whereas the detachable wall 77 is journalled on a sleeve 80 mounted for rotation on the shaft 68 and equipped with bearing bushings or the like 81. A drive element in the nature of a sprocket 82 is rigidly secured by means of a set screw or the like 83 to the sleeve 80 exterior of the rotary drum 72 and a gear 84 is anchored by a set screw 85 to the opposite end of the sleeve 80 within the drum 72. Anchored to the drive shaft 68 by a set screw or the like 86 is a driving gear 87 intermediate the inner end of the sleeve 80 and the bearing boss 79 of the drum 72. The gears 84 and 87 each have meshing engagement with a different one of a pair of intermeshing planet gears 88 and 89 that are journalled on circumferentially spaced shafts 90 and 91 respectively extending in directions parallel to each other and to the shaft 68.

Driving connections between the sprocket wheel 82 and the ground wheels 2 include the countershafts 73 and 74 each of which is provided with a sprocket wheel 92 and a chain running thereover and over the sprocket wheel 82 associated with its respective rotary element 71 and 72. Endless link chains 93 and 94 run over respective sprocket wheels 95 and 96 mounted fast on the countershafts 73 and 74 respectively and one each over one of a pair of sprocket wheels 97 each mounted for common rotation with an adjacent ground wheel 2. It will here be noted that the reel 32 is driven from the countershaft 74 by an endless belt 98 running over a pulley 99 fast on the countershaft 74 and another pulley 100 fast on the outer projected end of the reel shaft 34, see Figs. 2 and 4.

Each of the rotary drums 71 and 72 is equipped with a circumferentially extended brake band 101 which is anchored to the frame structure at one end, as indicated at 102, see Fig. 5. At their other ends, the brake bands 101 are secured to the outer ends of bifurcated lever arms 103 and 104 the other ends of which are rigidly secured to respective control shafts 105 and 106 that are journalled in suitable bearings on the frame structure 1. The said other ends of the brake bands 101 are connected to their respective bifurcated lever arms by links 107 and pins 108. The control shafts 105 and 106 extend transversely of the machine to a point adjacent the operator's seat 28 where they are rigidly secured to the lower ends of respective control rods 109 and 110 that extend generally upwardly so as to be readily engaged by the operator's hands. By manipulation of either control rod 109 or 110, the operator may stop rotation of its respective rotary drum 71 or 72, as desired, and as will hereinafter be further described.

The rotary drums 71 and 72 are adapted to be independently coupled to the shaft 68 by means of clutches 111 one each associated with one of the drums 71 and 72. Each of the clutches 111 comprises a disc 112 keyed or otherwise secured to the shaft 68 for common rotation therewith and for axial sliding movements with respect thereto and having clutch facings in the nature of annular friction plates 113 riveted or otherwise rigidly secured thereto, a pressure ring 114 biased toward engagement with one of the plates 113 by coil compression springs 115 and release fingers or levers 116 pivotally secured to a cover plate 117 bolted or otherwise rigidly secured to the drum axially outwardly of its end wall 76. The other of said friction plates 113 is adapted under pressure of the springs 115 to have frictional engagement with an annular outer wall surface 118 of the end wall 76, whereby to transmit rotation of the shaft 68 to the selected drum. Means for moving the fingers 116 to permit engagement of a selected clutch includes a thrust element in the nature of a collar 119, a thrust pin 120 extending axially therefrom, and a bell crank 121 mounted in a bracket 122 secured to the frame structure. With reference to Figs. 1 and 4, it will be seen that a single bracket 122 mounts the bell crank 121. Each of the bell cranks 121 is connected by a link 123 to the intermediate portion of a different one of the bifurcated crank arms 103 and 104.

The arrangement of the above described linkage is such that when the levers 109 and 110 are moved in one direction of movement about the axis of their respective control shafts 105 and 106, the brakes 101 of their respective rotary elements 71 and 72 will be loosened and the clutches 111 thereof will couple said rotary elements to the shaft 68 for common movements therewith. Moving the levers 109 and 110 to their limit of movement in the opposite direction will cause the clutches 111 to become disengaged and the brakes 101 to engage their respective rotary elements and frictionally lock the same against rotary movement. Moving the levers 109 and 110 to intermediate positions will disengage both the brakes 101 and the clutches 111. The last-mentioned position of the control levers 109 and 110 in their intermediate position permits rotary movement to be imparted to the drums 71 and 72 by engagement of the gears 87 with the planet gears 89 thereof in the same direction as that of rotary movement of the shaft 68 but at a lower speed. The gears 89 are rotated at a somewhat slower speed than that of the shaft 68 due to the slower rotary movement of the drums, and this rotary movement of the gears 89 is transmitted to their respective gears 88 in a reverse direction. The meshing engagement of the planet gears 88 with their respective gears 84 and the planetary movement of the gears 88 about the axis of the gears 84 causes the gears 84 to remain in a nonrotary condition so that no power is transferred to the ground wheels 2. Engagement of the clutches 111 and consequent further loosening of the brakes 101 will cause the planet gears 89 to remain stationary and cause the planet gears 89 to swing about the axis of the shaft 68 at the same speed as that of the drive gears 87 so that the sprocket wheels 82 will also rotate at the same speed as the shaft 68 and in the same direction, whereby to impart rotary movements to the ground wheels 2 to propel the machine in a forward direction. Movement of the control levers to their other extreme position to disengage the clutches 111 and tighten the brakes 101 will cause the planet gears 88 and 89 to act as reversing gears and cause consequent rotation of the ground wheels 2 in a reverse direction thus propelling the machine rearwardly.

From the above, it should be obvious that when one of the control levers 109 or 110 is in its intermediate position and the other thereof is moved to one or the other of its extreme operative positions, the machine will be caused to move about a vertical axis extending through the disengaged ground wheel 2. On the other hand, if one of the control levers is moved to its operative limit in one direction and the other thereof is moved to its limit of operative movement in the other direction, one of the ground wheels 2 will rotate in a forward direction and the other ground wheel 2 will rotate in a reverse direction, thereby swinging the machine about a vertical axis centrally between the ground wheels 2. From the above, it will be seen that my novel swather is capable of high maneuverability in restricted areas so that the grain may be cut to the very corners of the field and windrowed.

Location of the caster wheel 46 is dependent upon the direction of travel of the swather about a field to be harvested. For example, if it is desired to move the swather about the field in a clockwise direction, the supporting arms 55 and 56 are arranged so that the caster wheel 46 will be positioned as shown by full lines in Fig. 1. However, if it is desired to traverse the field in a counterclockwise direction, the caster wheel will be positioned as shown by dotted lines in Fig. 1. In other words, the caster wheel should be positioned in a laterally outwardly spaced relationship with respect to the windrow A and the standing grain in the field and not therebetween. When thus positioned, the caster wheel 46 will always be in spaced relationship to the windrowed grain when a corner is turned and will not run thereover.

In the producing of windrows of cut grain, it is desirable that the grain be stacked in the windrow in a manner to permit the same to dry evenly and to maintain the heads of the grain in spaced relation to the ground. This is effected by my novel swather utilizing the rearward inclination of the belt conveyors 7 and 8 and by running said conveyors at a definite predetermined speed. When the grain is cut by the knives 4 of the sickle 3, the forward motion of the machine together with the action of the reel 32 combine to cause the heads of the grain to lie toward the rear of the machine, and inclination of the conveyors causing the heads of the grain to be maintained at a higher level than the cut stalks or stems thereof. Then, when the grain is moved into the discharge opening 9 by the conveyors 7 and 8, the cut ends of the stalks of grain fall to the ground prior to the heads and the heads continue their laterally inward movement, said heads discharged from one conveyor becoming interlaced with the heads discharged from the other conveyor. Thus, the stems will support each other with the heads thereof uppermost and in a position to dry out readily and without the necessity of turning the windrow as is otherwise necessary. I have found by considerable experimentation that the most satisfactory results are obtained in forming this type of windrow when the belt conveyors are tilted to an angle of 28° as shown and as above indicated; and, when the speed of linear travel of the conveyors is between 350 and 500 feet per minute, preferably 400 to 500 feet per minute. The speed of the swather in its travel through a field is determined somewhat by the thickness of the stand of grain. However, the swather is designed to have a normal speed between 2 and 6 miles per hour and satisfactory results may be obtained when driven according to usual operating conditions.

My invention has been thoroughly tested and found to be completely satisfactory for the accomplishment of the objectives set forth; and while I have shown and described a preferred embodiment of my novel swather, it will be understood that the same is capable of modification without departure from the spirit and scope of the invention, as defined in the claims.

What I claim is:

1. A self-propelled swather comprising a wheel-equipped frame structure, a sickle extending across the front end portion of said frame structure in spaced relation to the ground and including a reciprocatory cutter element, a pair of laterally spaced belt conveyors disposed in a plane inclining rearwardly from said sickle at an angle within a range of from 25 to 35 degrees from the horizontal, means mounting said conveyors on said frame structure for feeding movements toward the lateral center thereof, the inner ends of said conveyors defining the opposite sides of a central discharge opening, a reel overlying said sickle, and means including a motor for imparting reciprocatory movements to said cutter element, rotary movements to said reel, feeding movements to said conveyor at a rate of from 350 to 500 linear feet per minute, and drive rotation to said wheels to propel said swather according to normal operating conditions, whereby the cut grain will be delivered by said conveyor belt through said discharge opening with the heads of the stalks in crosscross rearwardly inclining arrangement in a swath.

2. In a grain swather as defined in claim 1, in which said frame structure comprises a transversely extending front portion and two rearwardly diverging side portions, said side portions being relatively adjustable longitudinally thereof and pivotally connected to said front portion, and the rear ends of said side portions being pivoted together for selective support by a caster on either side of the cut grain discharged from said opening.

3. A grain swather comprising a supporting frame of substantially triangular shape, an axle forming one side of said frame and having traction wheels at opposite ends thereof, the two remaining sides being relatively extensible, a caster wheel supporting the apex of said frame opposite said axle, a cutter frame extending forwardly from said axle and having a cutter bar supported thereby substantially parallel to said axle at a distance therefrom of approximately half of the length of said axle, belt conveyors mounted on said cutter frame to the rear of said cutter having top flights traveling inwardly, said conveyors being spaced apart at their adjacent ends to provide a space for the discharge of cut grain, the said conveyors being substantially in a single plane which is inclined upwardly and rearwardly in the order of 25 to 35 degrees, and a motor on said supporting frame operatively connected to said cutter, said conveyors and said wheels, the connection to said wheels being individually reversible, whereby by reversing one wheel and continuing forward movement of the other wheel the swather may be pivoted about the center of said axle.

4. A grain swather comprising a supporting frame of substantially triangular shape, an axle forming one side of said frame and having traction wheels at opposite ends thereof, one of said two remaining sides being extensible, a caster wheel supporting the apex of said frame opposite said axle, a cutter frame extending forwardly from said axle and having a cutter bar supported thereby substantially parallel to said axle at a distance therefrom of approximately half of the length of said axle, belt conveyors mounted on said cutter frame to the rear of said cutter having top flights traveling inwardly, said conveyors being spaced apart at their adjacent ends to provide a space for the discharge of cut grain, the said conveyors being substantially in a single plane which is inclined upwardly and rearwardly in the order of 25 to 35 degrees, and a motor on said supporting frame operatively connected to said cutter, said conveyors and said wheels, the connection to said wheels being individually reversible, whereby by reversing one wheel and continuing forward movement of the other wheel the swather may be pivoted about the center of said axle.

References Cited in the file of this patent

UNITED STATES PATENTS

| Number | Name | Date |
| --- | --- | --- |
| 885,157 | Hovland | Apr. 21, 1908 |
| 1,183,092 | McGill | May 16, 1916 |
| 1,906,498 | Templeton | May 2, 1933 |
| 1,932,717 | Wickersham | Oct. 31, 1933 |
| 2,240,168 | Adkisson | Apr. 29, 1941 |
| 2,492,223 | Jenson | Dec. 27, 1949 |